Aug. 13, 1929.  J. FIELDING  1,724,268
HINGE MEMBER FOR OPHTHALMIC MOUNTINGS
Filed July 9, 1927
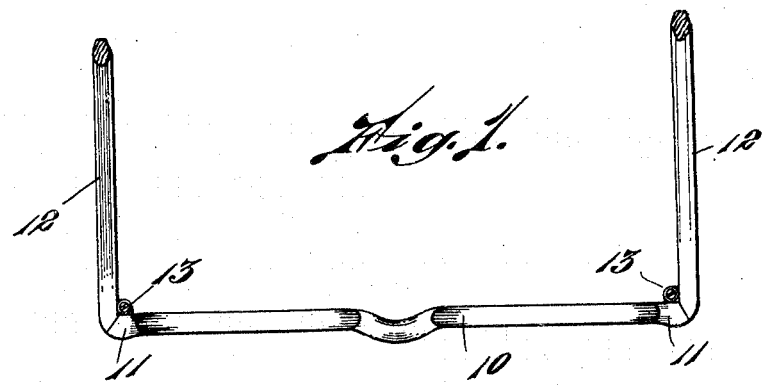
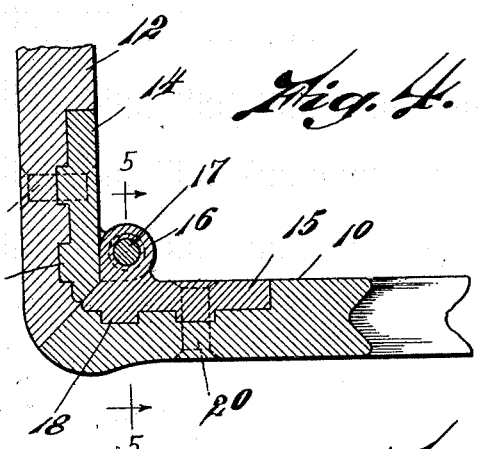
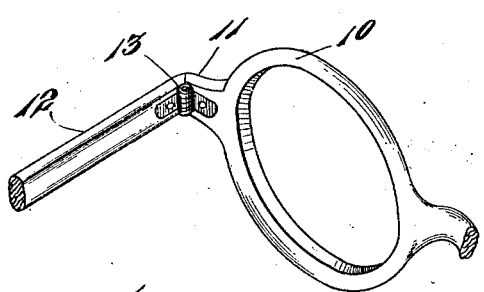
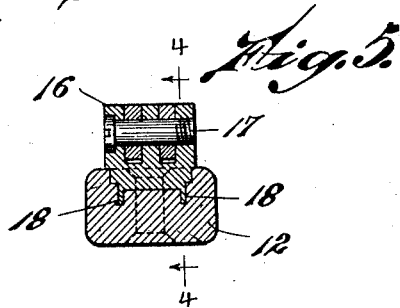
INVENTOR.
John Fielding.
BY Barlow & Barlow
ATTORNEYS.

Patented Aug. 13, 1929.

1,724,268

UNITED STATES PATENT OFFICE.

JOHN FIELDING, OF NORTH PROVIDENCE, RHODE ISLAND, ASSIGNOR OF ONE-HALF TO JOSEPH P. WHITAKER, OF APPONAUG, RHODE ISLAND.

HINGE MEMBER FOR OPHTHALMIC MOUNTINGS.

Application filed July 9, 1927. Serial No. 204,557.

This invention relates to an improved hinge joint for temples of ophthalmic mountings; and has for its object to provide such a hinge which is adapted more particularly to be imbedded into non-metallic members of such a mounting to more securely connect the metal joint members to the non-metallic members of the mounting.

A further object of the invention is the provision of one or more integral securing projections on the bottom of the base-plate of one or both of the hinge members to cooperate with the rivet pin in securing these hinge members in position in the non-metallic material.

With these and other objects in view, the invention consists of certain novel features of construction, as will be more fully described, and particularly pointed out in the appended claims.

In the accompanying drawings:

Fig. 1 shows an edge view of the ophthalmic mounting with the temples hinged to the frame by the use of hinges of my improved construction.

Fig. 2 is a perspective view illustrating the raised members or projections on the bottom of one of the hinge base plates.

Fig. 3 shows a similar arrangement of securing the projections raised from the bottom of the opposite hinge plate.

Fig. 4 is a sectional view showing these hinge plates as pivotally connected together and also secured in position in their respective non-metallic members of the mounting.

Fig. 5 is a section on line 5—5 of Fig. 4 through the joint of the hinge and also through a pair of these securing projections.

Fig. 6 is a perspective view showing a portion of the mounting with my improved hinge member in position therein.

It is found in the practical construction and operation of ophthalmic mountings particularly to the non-metallic type, of advantage to provide a hinge for connecting the temple member to the frame member by imbedding the hinge plates in their respective members and securing them in position each with a single rivet, but it is found that the single rivet is not sufficient to retain these hinge plates securely in position against working loose in their respective imbedded positions, that it is advisable and in most cases necessary to provide projections for assisting these single rivets in retaining the base-plates against movement.

It is also found of advantage to locate these projections preferably within the marginal limits of the hinge base plates so as not to disturb the front face of the celluloid when the hinge plate is forced and so imbedded therein, whereby the metal may be inserted into the celluloid without forming cracks or spaces about the edge of the inserted metal; and the following is a detailed description of the present embodiment of my invention and showing one means by which these advantageous results may be accomplished:

With reference to the drawings, 10 designates the frame portion of an ophthalmic mounting which is usually made of celluloid or other non-metallic material and is provided with end pieces 11 to which the temple members 12 of this mounting are secured by means of hinges 13. Each of these hinges is preferably made up of two parts one part 14 to be imbedded into the inner surface of the temple and the other part 15 to be imbedded into the end piece 11 of the frame.

These members 14 and 15 are pivotally connected together through their respective hinge ears 16 by means of the pivot pin 17. The body portion of each of these members 14 and 15 is provided with one or more projections 18 preferably formed integral with and raised from the stock of the bottom portion thereof by a swaging operation from the opposite edges of the base plate to lift the stock at intervals from the plane of the bottom face forming these spurs or projections integral with the base-plate and spaced apart about its edge.

I do not wish to be restricted, however, to forming these projections spaced inwardly from the margin of the base plate as they may be formed at the marginal edge, if desired. Each of these hinge plates is provided with a hole 19 through which a cooperating securing rivet or screw 20 may pass to assist these projections in securing the imbedded hinge plates in their respective mounting members in the position illustrated in Fig. 4.

By my improved construction of hinge members for an ophthalmic mounting the temple may be securely connected to the frame portion of the mounting by the use of a single rivet, the spurs or projections serving to effectively lock the hinge placed in its respective recess against being loosened therein even by severe strains on the temple members. Also, by setting the projections inwardly from the margin these plates may be forced and so inserted into the non-metallic material of the mounting without disturbing the stock about its periphery and so permit the stock of this non-metallic material to lie up close about the inlaid material or leaving a space about the margin of the metal.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A hinge member having a base-plate, a plurality of separate integral projections parallel to and spaced from each opposite side margin of said base and raised from the plane of its bottom face.

2. A hinge member having a base-plate with a bottom portion provided with integral locking projections spaced parallel to and inwardly from the sides thereof and extending from the plane of its bottom face, said base plate having positioning means for a fastening rivet.

3. A hinge member having a base-plate with a bottom portion provided with an integral securing projection swaged inwardly from the opposite side edges of the plate and lifted from the plane of its bottom face.

4. A hinge member having a base plate provided with a plurality of projections swaged inwardly from the opposite side edges of the plate, said projections being raised from the plane of the bottom face of the plate at spaced points adjacent each of the opposite side edges thereof leaving recesses therein.

In testimony whereof I affix my signature.

JOHN FIELDING.